United States Patent
Goto et al.

(10) Patent No.: US 11,794,457 B2
(45) Date of Patent: Oct. 24, 2023

(54) MULTILAYERED STRETCHED POLYAMIDE FILM

(71) Applicant: TOYOBO CO., LTD., Osaka (JP)

(72) Inventors: Takamichi Goto, Inuyama (JP); Takuro Endo, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/765,623

(22) PCT Filed: Aug. 26, 2020

(86) PCT No.: PCT/JP2020/032243
§ 371 (c)(1),
(2) Date: Mar. 31, 2022

(87) PCT Pub. No.: WO2021/065257
PCT Pub. Date: Apr. 8, 2021

(65) Prior Publication Data
US 2022/0266580 A1    Aug. 25, 2022

(30) Foreign Application Priority Data
Oct. 4, 2019 (JP) .................................. 2019-183713

(51) Int. Cl.
| | |
|---|---|
| *B32B 27/34* | (2006.01) |
| *B29C 48/00* | (2019.01) |
| *B29C 48/21* | (2019.01) |
| *B29C 55/00* | (2006.01) |
| *B29C 55/14* | (2006.01) |
| *B32B 7/12* | (2006.01) |
| *B32B 27/08* | (2006.01) |
| *B32B 27/20* | (2006.01) |
| *B32B 37/15* | (2006.01) |
| *B32B 38/00* | (2006.01) |
| *B29K 77/00* | (2006.01) |
| *B29L 7/00* | (2006.01) |

(52) U.S. Cl.
CPC .......... *B32B 27/34* (2013.01); *B29C 48/0018* (2019.02); *B29C 48/022* (2019.02); *B29C 48/21* (2019.02); *B29C 55/005* (2013.01); *B29C 55/143* (2013.01); *B32B 7/12* (2013.01); *B32B 27/08* (2013.01); *B32B 27/20* (2013.01); *B32B 37/153* (2013.01); *B32B 38/0012* (2013.01); *B29K 2077/00* (2013.01); *B29L 2007/002* (2013.01); *B32B 2038/0028* (2013.01); *B32B 2250/03* (2013.01); *B32B 2250/24* (2013.01); *B32B 2264/1021* (2020.08); *B32B 2264/303* (2020.08); *B32B 2307/518* (2013.01); *B32B 2307/54* (2013.01); *B32B 2307/558* (2013.01); *B32B 2307/581* (2013.01); *B32B 2307/7265* (2013.01); *B32B 2307/732* (2013.01); *B32B 2439/46* (2013.01); *B32B 2439/70* (2013.01); *B32B 2553/00* (2013.01)

(58) Field of Classification Search
CPC ......... B32B 27/20; B32B 27/34; C08L 77/00; C08L 77/02; C08L 77/04; C08L 77/06; C08L 77/08
See application file for complete search history.

(56) References Cited

U.S. PATENT DOCUMENTS

| | | | |
|---|---|---|---|
| 5,094,799 A | 3/1992 | Takashige et al. | |
| 2002/0018905 A1 | 2/2002 | Okudaira et al. | |
| 2008/0248268 A1* | 10/2008 | Delius | A22C 13/0013 |
| | | | 428/474.9 |
| 2022/0153007 A1 | 5/2022 | Endo et al. | |
| 2022/0266580 A1 | 8/2022 | Goto et al. | |

FOREIGN PATENT DOCUMENTS

| | | |
|---|---|---|
| CN | 1349458 A | 5/2002 |
| CN | 102190120 A | 9/2011 |
| EP | 1172202 A1 | 1/2002 |

(Continued)

OTHER PUBLICATIONS

Japanese Patent Office, International Search Report in International Patent Application No. PCT/JP2020/032243 (dated Oct. 27, 2020).
China National Intellectual Property Administration, Office Action in Chinese Patent Application No. 202080022334.2 (dated Sep. 30, 2022).
China National Intellectual Property Administration, Office Action in Chinese Patent Application No. 202080022334.2 (dated Mar. 23, 2023).
European Patent Office, Extended European Search Report in European Patent Application No. 20779438.9 (dated Nov. 8, 2022).
Intellectual Property India, Examination Report in Indian Patent Application No. 202147045386 (dated Sep. 23, 2022).

(Continued)

*Primary Examiner* — Zachary M Davis
(74) *Attorney, Agent, or Firm* — Leydig, Voit & Mayer, Ltd.

(57) ABSTRACT

A multilayered stretched polyamide film which is biaxially stretched, and comprises three layers composed of a polyamide resin composition and comprising layer B as an easily adhesive layer, layer A as a base layer, and layer C as an easily slippery layer in this order, wherein the film satisfies the following (1) to (4); (1) the layer A contains 50 to 90% by mass of polyamide 6 and 10 to 50% by mass of a polyamide 6 copolymer in which a ratio of a copolymerization component in the copolymer is 3 to 35% by mass; (2) the layer B contains 0 to 40% by mass of polyamide 6 and 60 to 100% by mass of the polyamide 6 copolymer in which a ratio of the copolymerization component in the copolymer is 3 to 35% by mass; (3) the layer C contains 70% by mass or more of polyamide 6 and 0.05 to 1% by mass of fine particles having an average diameter of 0.1 to 10 μm; (4) the film has tensile strength at break of 150 MPa or more both in MD direction and TD direction; and (5) the film has laminate strength of 3.3 N/15 mm or more.

4 Claims, No Drawings

(56) References Cited

FOREIGN PATENT DOCUMENTS

| | | | |
|---|---:|---|---|
| EP | 1167018 | A3 | 8/2003 |
| JP | S57-008647 | B2 | 2/1982 |
| JP | H06-037081 | B2 | 5/1994 |
| JP | 2000-238216 | A | 9/2000 |
| JP | 2002-029014 | A | 1/2002 |
| JP | 2002-103446 | A | 4/2002 |
| JP | 2003-251772 | A | 9/2003 |
| JP | 4178814 | B2 | 11/2008 |
| JP | 2009-154294 | A | 7/2009 |
| JP | 2010-253713 | A | 11/2010 |
| JP | 4660866 | B2 | 3/2011 |
| JP | 5068084 | B2 | 11/2012 |
| JP | 5383563 | B2 | 1/2014 |

OTHER PUBLICATIONS

Japanese Patent Office, International Search Report in International Patent Application No. PCT/JP2020/010311 (dated Jun. 16, 2020).
Taiwan Intellectual Property Office, Office Action in Taiwanese Patent Application No. 109108862 (dated May 29, 2023).
Japan Patent Office, Office Action in Japanese Patent Application No. 2020-555088 (dated Aug. 1, 2023).

\* cited by examiner

MULTILAYERED STRETCHED POLYAMIDE FILM

TECHNICAL FIELD

The present invention relates to a biaxially stretched polyamide film that has excellent adhesiveness. In particular, the present invention relates to a biaxially stretched polyamide film that has excellent water-resistant adhesive strength with a sealant film.

BACKGROUND ART

A biaxially stretched polyamide film has excellent tensile strength, bending strength, pinhole resistance, oil resistance, oxygen gas barrier property, and the like, and therefore, has been used as a packaging material, especially as a material for packaging food.

The biaxially stretched polyamide film is used for a packaging bag, for example. The packaging bag is usually made by: laminating a polyolefin film that is capable of being heat-sealed (also referred to as a sealant film) such as polyethylene and polypropylene on the biaxially stretched polyamide film; and heat-sealing edges that become closed parts of a bag. Such a biaxially stretched polyamide film has been widely used as a food packaging material.

However, a laminated film composed of the biaxially stretched polyamide film and the sealant film has a problem that when the laminated film is used as a liquid soup bag or a bag for a watery material, the films that have been laminated are separated since the adhesive strength (also referred to as laminate strength) between the films that have been laminated is insufficient. In particular, the laminated film has a disadvantage that when the laminated film is hydrothermally treated at high temperatures such as retorting, water penetrates between the films that have been laminated, and the laminate strength between the biaxially stretched polyamide film and the sealant film decreases greatly.

As a method for improving laminate strength, a method in which a film surface is coated in a film manufacturing process to increase adhesive strength has been proposed (see Patent Document 1). However, this method has a problem that the productivity is reduced, and the production cost increases. In addition, the method has a problem that blocking and defects such as a stripe and a flaw occur due to the coating. Furthermore, the method has a problem that dot blanks of printing ink occur when printed on the biaxially stretched polyamide film. Therefore, a biaxially stretched polyamide film having high laminate strength without coating is desired.

Accordingly, a laminated polyamide film that is made by co-extruding layers as a surface layer in which a copolymerization polyamide is blended to obtain a unstretched sheet and biaxially stretching the unstretched sheet has been proposed (see Patent Document 2). This method improves laminate strength, but the surface of the film has to be coated in a film manufacturing process to obtain high water-resistant laminate strength. Therefore, even by this method, all the problems above mentioned cannot be solved.

Meanwhile, a method for manufacturing a biaxially stretched polyamide film having an improved sequential biaxial stretching property and composed of a polyamide 6/66 copolymer has been proposed (see Patent Document 3).

Also, a method for manufacturing a biaxially stretched polyamide 6/66 copolymer film having good thickness precision by a tubular method has been proposed (see Patent Document 4).

These biaxially stretched polyamide films each composed of a polyamide 6/66 copolymer have a lower melting point compared to those of polyamide 6 and polyamide 66. The biaxially stretched polyamide films therefore have low heat resistance and dimensional stability at high temperatures and are not suitable for use as a film for a packaging bag used for boiling treatment and retorting treatment. In addition, since polyamide 6/66 copolymer is less likely to be orientally crystallized than polyamide 6, a polyamide film containing a large amount of polyamide 6/66 copolymer has a problem of reduced mechanical strength even when the same stretching method is used.

A five-layered biaxially stretched polyamide film made by laminating and extruding a layer composed essentially of polyamide 6, a layer composed of polyamide 6 and polyamide 6/66, and a barrier layer containing a saponified ethylene-vinyl acetate copolymer has been proposed (see Patent Document 5). However, since the five-layered biaxially stretched polyamide film includes the barrier layer containing the saponified ethylene-vinyl acetate copolymer, the film around clip grippers in a tenter cannot be recovered and reused. Using a layer composed essentially of poly(meta-xylylene adipamide) as a barrier layer has also been proposed (see Patent Document 6). However, in this case, the film has a problem of having reduced shock resistance and pinhole resistance.

PRIOR ART DOCUMENTS

Patent Document

Patent Document 1: Japanese Patent No. 04660866
Patent Document 2: Japanese Patent No. 04178814
Patent Document 3: Japanese Unexamined Patent Publication No. S57-8647
Patent Document 4: Japanese Unexamined Patent Publication No. H6-37081
Patent Document 5: Japanese Patent No. 05068084
Patent Document 6: Japanese Patent No. 05383563

SUMMARY OF THE INVENTION

Problems to be Solved by the Invention

An object of the present invention is to solve the above-described problems of the conventional biaxially stretched polyamide films and to provide, at a low cost, a biaxially stretched polyamide film which has excellent adhesive strength, especially water-resistant laminate strength, in which dot blanks are less likely to occur during printing, and which has excellent mechanical strength.

Solution to the Problems

As a result of earnest studies, the present inventors have found that the problems can be solved with a laminated stretched polyamide film made by laminating an easily adhesive layer composed essentially of a polyamide 6 copolymer on a base layer composed essentially of polyamide 6, laminating an easily slippery layer on the opposite side of the base layer, and forming under a specified stretching condition, and the present invention has been attained.

The present invention includes the following features.

[1] A multilayered stretched polyamide film which is biaxially stretched, and comprises at least three layers composed of a polyamide resin composition and comprising layer B as an easily adhesive layer, layer A as a base layer, and layer C as an easily slippery layer in this order, wherein the film satisfies the following (1) to (4);

(1) the layer A contains 50 to 90% by mass of polyamide 6 and 10 to 50% by mass of a polyamide 6 copolymer in which a ratio of a copolymerization component in the copolymer is 3 to 35% by mass;

(2) the layer B contains 0 to 40% by mass of polyamide 6 and 60 to 100% by mass of the polyamide 6 copolymer in which a ratio of the copolymerization component in the copolymer is 3 to 35% by mass;

(3) the layer C contains 70% by mass or more of polyamide 6 and 0.05 to 1% by mass of fine particles having an average diameter of 0.1 to 10 μm;

(4) the film has tensile strength at break of 150 MPa or more both in MD direction and TD direction; and (5) the film has laminate strength of 3.3 N/15 mm or more.

[2] The multilayered stretched polyamide film according to the above [1], wherein the multilayered stretched polyamide film has a degree of plane orientation ΔP of 0.20 or larger.

[3] The multilayered stretched polyamide film according to the above [1] or [2], wherein the polyamide 6 copolymer is a polyamide 6/66 copolymer.

[4] The multilayered stretched polyamide film according to the above [1] or [2], wherein the polyamide 6 copolymer is a polyamide 6/12 copolymer.

[5] The multilayered stretched polyamide film according to any one of the above [1] to [4], wherein the multilayered stretched polyamide film has a thickness of 5 to 30 μm, the layer A has a thickness of 4 μm or more, the layer B has a thickness of 0.5 μm or more, and the layer C has a thickness of 0.5 μm or more.

[6] The multilayered stretched polyamide film according to any one of the above [1] to [5], wherein the film has water-resistant laminate strength of 2.0 N/15 mm or more.

The multilayered stretched polyamide film of the embodiment of the present invention has excellent tensile strength, impact strength, bending strength, pinhole resistance, oil resistance, and oxygen gas barrier property of a biaxially stretched polyamide film, due to the base layer (layer A) containing 50 to 90% by mass of polyamide 6.

The easily adhesive layer (layer B) can contribute to the above-mentioned excellent characteristics of the biaxially stretched polyamide film, and also can have highly increased laminate strength with a sealant film. In particular, the easily adhesive layer (layer B) can have significantly improved water-resistant laminate strength.

Further, the easily slippery layer (layer C) contains a predetermined amount of fine particles having an average particle diameter of 0.1 to 10 μm, which can reduce a coefficient of friction. Accordingly, when the multilayered stretched polyamide film of the present invention is used as bags, the bags have good slipperiness between each other, so the bags are easy to transport when filled with contents.

Furthermore, although the multilayered stretched polyamide film of the present invention is a multilayered polyamide film including a layer containing a copolymerized polyamide which is difficult to orientally crystallize (difficult to increase the strength), the multilayered stretched polyamide film of the present invention has excellent mechanical strength by setting a specific degree of plane orientation.

Effects of the Invention

The multilayered stretched polyamide film of the present invention has high water-resistant laminate strength in addition to the excellent impact strength, pinhole resistance, oxygen gas barrier property, and the like of a biaxially stretched polyamide film. Therefore, the multilayered stretched polyamide film is effective for preventing a soup packaging bag, a watery material packaging bag, and the like from breaking due to impact or vibration during transportation.

Also, due to elimination of a coating process to improve adhesiveness, the multilayered stretched polyamide film of the present invention has advantages that the multilayered stretched polyamide film has good productivity, is economical, and has few defects such as a flaw generated during the coating process. The multilayered stretched polyamide film of the present invention has an advantage that the multilayered stretched polyamide film is hygienic since a coating agent is not laminated.

DESCRIPTION OF EMBODIMENTS

Hereinafter, the present invention will be described in detail.

A multilayered stretched polyamide film according to the present invention is a multilayered stretched polyamide film in which an easily adhesive layer (layer B) is laminated on one side of a base layer (layer A), and an easily slippery layer (layer C) is laminated on the other side of the base layer (layer A). The base layer (layer A) contains 50 to 90% by mass or more of polyamide 6, the easily adhesive layer (layer B) contains 0 to 40% by mass of polyamide 6 and 60 to 100% by mass of polyamide 6 copolymer in which the ratio of copolymerization components is 3 to 35% by mass, and the easily slippery layer (layer C) composes essentially of polyamide 6 and contains 0.05 to 1% by mass of fine particles having an average diameter of 0.1 to 10 μm.

<Thickness Configuration of Multilayered Polyamide Film>

The multilayered stretched polyamide film of the present invention has a total thickness of 5 to 30 μm. If the total thickness of the multilayered stretched polyamide film is thicker than 30 μm, the performance of the multilayered stretched polyamide film is saturated in terms of strength. In addition, the flexibility is reduced when such a multilayered stretched polyamide film laminated with a sealant is used as a packaging bag.

Thickness of the base layer (layer A) of the multilayered stretched polyamide film of the present invention is preferably 4.0 μm or more. The thickness is more preferably 4.5 μm or more. If the thickness of the base layer (layer A) is thinner than 4.0 μm, the entire film may become too soft to be processed by a printer or a bag making machine.

The easily adhesive layer (layer B) of the multilayered stretched polyamide film of the present invention preferably has a thickness of 0.5 μm or more. If the thickness of the layer B is thinner than 0.5 μm, water-resistant laminate strength that is the object of the present invention is not obtained. There is no specific upper limit for the thickness of the layer B. However, when the layer B has a thickness of thicker than 5 μm, the water-resistant laminate strength starts to be saturated while the strength of the entire film is decreased. Therefore, the thickness of the layer B is preferably 5 µm or less.

The easily slippery layer (layer C) of the multilayered stretched polyamide film of the present invention preferably has a thickness of 0.5 µm or more. If the thickness of the layer C is thinner than 0.5 µm, the effect of improving slipperiness becomes diminished. Also, the thickness unevenness tends to increase. There is no specific upper limit for the thickness of the layer C. However, as the thickness of the layer C increases, the transparency of the film tends to deteriorate.

<Base Layer (Layer A)>

The base layer (layer A) of the multilayered stretched polyamide film of the present invention contains 50 to 90% by mass of polyamide 6. If the base layer contains lower than 50% by mass of polyamide 6, sufficient impact strength, pinhole resistance, dimensional stability at high temperatures, and transparency are not obtained.

Polyamide 6 to be used in the base layer (layer A) is usually manufactured by ring-opening polymerization of ε-caprolactam. ε-caprolactam monomers in the polyamide 6 obtained by the ring-opening polymerization are usually removed with hot water, and then the polyamide 6 is dried and melt-extruded with an extruder.

The polyamide 6 has a relative viscosity of preferably 1.8 to 4.5 and more preferably 2.6 to 3.2. If the relative viscosity is lower than 1.8, the film has insufficient impact strength. If the relative viscosity is higher than 4.5, a load on the extruder becomes large, and it becomes difficult to obtain a sheet before stretching.

The base layer (layer A) contains 10 to 50% by mass of a polyamide 6 copolymer. The adhesive strength between the layer A and the layer B can be increased by including the polyamide 6 copolymer in the layer A. The copolymerization component of polyamide 6 copolymer contained in the base layer (layer A) is preferably the same as the copolymerization component of polyamide 6 copolymer in the layer B.

The layer A may contain 0.5 to 30% by mass of polyamide MXD6 (poly(meta-xylylene adipamide)). A stretching property can be improved by including the polyamide MXD6. As a result, the effect of suppressing film breakage during production of the film and the effect of reducing film thickness unevenness are provided.

The layer A may contain 0.5 to 30% by mass of a polyamide elastomer or a polyolefin elastomer. The pinhole resistance can be improved by including the polyamide elastomer or the polyolefin elastomer.

Examples of the polyamide elastomer to be used include a polyamide elastomer composed of a hard segment of nylon 12 and a soft segment of polytetramethylene glycol, and the like.

Examples of the polyolefin elastomer to be used include a block copolymer having a polyolefin as a hard segment and various types of rubber component as a soft segment, and the like. Examples of the polyolefin forming a hard segment include ethylene, propylene, 1-butene, 1-pentene, and 4-methyl-1-pentene. Examples of the rubber component forming a soft segment include ethylene-propylene rubber (EPR), ethylene propylene diene rubber (EPDM), polybutadiene, and the like.

<Easily Adhesive Layer (Layer B)>

The easily adhesive layer (layer B) of the multilayered stretched polyamide film of the present invention contains 60 to 100% by mass of a polyamide 6 copolymer in which the ratio of a copolymerization component in the copolymer is 3 to 35% by mass.

If the content of the polyamide 6 copolymer in the easily adhesive layer (layer B) is less than 60% by mass, sufficient water-resistant laminate strength is not obtained.

The ratio of the copolymerization component in the polyamide 6 copolymer is 3 to 35% by mass. If the ratio of the copolymerization component is less than 3% by mass, sufficient water-resistant laminate strength is not obtained.

If the ratio of the copolymerization component in the copolymer is higher than 35% by mass, handling may become difficult at the time of supplying the raw material.

The polyamide 6 copolymer has a melting point of preferably 170 to 220° C., more preferably 175 to 215° C., and further preferably 180 to 210° C. If the melting point of the polyamide 6 copolymer is higher than 215° C., sufficient water-resistant adhesiveness may not be obtained. If the melting point of the polyamide 6 copolymer is lower than 170° C., handling may become difficult at the time of supplying the raw material.

The polyamide 6 copolymer to be used in the easily adhesive layer (layer B) is obtained by copolymerizing ε-caprolactam or aminocaproic acid with a copolymerization component in a ratio of 3 to 35% by mass. Here, the ratio of the copolymerization is expressed by % by mass after monomers remaining after the copolymerization are removed with hot water or the like.

The polyamide 6 copolymer is obtained by copolymerizing ε-caprolactam with, for example, a lactam other than ε-caprolactam, an amino acid other than aminocaproic acid, or a salt of a dicarboxylic acid and a diamine, as the copolymerization component. Examples of a monomer to be copolymerized with ε-caprolactam in the polymerization of the polyamide 6 copolymer include undecane lactam, lauryl lactam, amino undecanoic acid, amino lauric acid, adipic acid, pimelic acid, azelaic acid, sebacic acid, terephthalic acid, isophthalic acid, hexamethylenediamine, nonanediamine, decanediamine, methyl pentane diamine, methaxylilene diamine, and trimethyl hexamethylene diamine.

Examples of the polyamide 6 copolymer include a polyamide 6/66 copolymer, a polyamide 6/12 copolymer, a polyamide 6/6T copolymer, a polyamide 6/610 copolymer, a polyamide 6/6I copolymer, a polyamide 6/9T copolymer, a polyamide 6/11 copolymer, and the like.

The polyamide 6/66 copolymer to be used in the easily adhesive layer (layer B) is obtained, for example, by a method in which ε-caprolactam is polymerized with hexamethylene diammonium adipate.

A commercially available product such as Ultramid C3301 (manufactured by BASF), Nylon 5023B (manufactured by Ube Industries, Ltd.), and the like can also be used.

The above products can also be used as the polyamide 6/66 copolymer that may be contained in an amount of 0.5 to 30% by mass in the layer A.

With regard to the copolymerization ratio of polyamide 6 and polyamide 66 in the polyamide 6/66 copolymer, the ratio of the polyamide 66 in the polyamide 6/66 copolymer is 3 to 35% by mass, preferably 5 to 30% by mass, and more preferably 5 to 25% by mass.

If the ratio of the polyamide 66 in the polyamide 6/66 copolymer is lower than 3% by mass, easy adhesiveness, which is the challenge of the present invention, is not exhibited.

If the ratio of the polyamide 66 in the polyamide 6/66 copolymer is higher than 35% by mass, the crystallinity of the copolymer decreases, and handling of the copolymer may become difficult.

The polyamide 6/66 copolymer has a relative viscosity of preferably 1.8 to 4.5 and more preferably 2.6 to 3.2.

The polyamide 6/12 copolymer to be used in the easily adhesive layer (layer B) is obtained, for example, by a method in which ε-caprolactam is polymerized with ω-lauryl lactam.

A commercially available product such as nylon resin 7024B (manufactured by Ube Industries, Ltd.), and the like can also be used.

The above products can also be used as the polyamide 6/12 copolymer that may be contained in an amount of 0.5 to 30% by mass in the layer A.

With regard to the copolymerization ratio of polyamide 6 and polyamide 12 in the polyamide 6/12 copolymer, the ratio of the polyamide 12 in the polyamide 6/12 copolymer is 3 to 35% by mass, preferably 5 to 30% by mass, and more preferably 5 to 25% by mass.

If the ratio of the polyamide 12 in the polyamide 6/12 copolymer is lower than 3% by mass, easy adhesiveness, which is the challenge of the present invention, is not exhibited.

If the ratio of the polyamide 12 in the polyamide 6/12 copolymer is higher than 35% by mass, the crystallinity of the copolymer decreases, and handling of the copolymer may become difficult.

The polyamide 6/12 copolymer has a relative viscosity of preferably 1.8 to 4.5 and more preferably 2.5 to 4.0.

An important point in the present invention is that the easily adhesive layer (layer B) containing the polyamide 6 copolymer is laminated on the surface, of the base layer (layer A), on the side on which a sealant is laminated, whereby the degree of crystallinity of the surface on which the sealant is laminated is reduced and the adhesiveness is improved.

<Easily Slippery Layer (Layer C)>

The easily slippery layer (layer C) of the multilayered stretched polyamide film of the present invention contains not lower than 70% by mass of polyamide 6 and 0.05 to 1% by mass of fine particles having an average particle diameter of 0.1 to 10 μm.

By containing not lower than 70% by mass of polyamide 6, the strength of the multilayered stretched polyamide film can be maintained.

By containing 0.05 to 1% by mass of fine particles having an average particle diameter of 0.1 to 10 μm, minute protrusions are formed on the surface of the easily slippery layer (layer C), so that the contact between the laminated stretched film surfaces is reduced, making the film slippery.

The fine particles can be appropriately selected and used from inorganic lubricants such as silica, kaolin, and zeolite and polymeric organic lubricants such as acrylic-based lubricants and polystyrene-based lubricants. It is noted that silica fine particles are preferably used from the viewpoint of transparency and slipperiness.

The fine particles have an average particle diameter of preferably 0.5 to 5.0 μm and more preferably 1.0 to 3.0 μm. If the average particle diameter is less than 0.5 μm, a large addition amount is required to obtain good slipperiness. If the average particle diameter exceeds 5.0 μm, the surface roughness of the film becomes too large to satisfy practical characteristics such as poor appearance, so that such an average particle diameter is not preferable.

The range of the pore volume of the fine particles is preferably 0.5 to 2.0 ml/g and more preferably 0.8 to 1.6 ml/g. If the pore volume is less than 0.5 ml/g, voids are likely to occur and the transparency of the film deteriorates, and if the pore volume exceeds 2.0 ml/g, protrusions on the surface due to the fine particles are less likely to be formed and the slipperiness of the film deteriorates, so that such a pore volume is not preferable.

The easily slippery layer (layer C) of the multilayered stretched polyamide film of the present invention may contain a fatty acid amide and/or a fatty acid bisamide for the purpose of improving slipperiness. Examples of the fatty acid amide and/or the fatty acid bisamide include erucic acid amide, stearic acid amide, ethylene bisstearic acid amide, ethylene bisbehenic acid amide, ethylene bisoleic acid amide, and the like.

The content of the fatty acid amide and/or the fatty acid bisamide in the polyamide polymer in this case is preferably 0.01 to 0.40% by mass and further preferably 0.05 to 0.30% by mass. If the content of the fatty acid amide and/or the fatty acid bisamide is less than the above range, the slipperiness becomes poor and processing suitability in printing, laminating, and the like becomes poor, and if the content of the fatty acid amide and/or the fatty acid bisamide exceeds the above range, spots may occur on the film surface due to bleeding on the surface over time, so that such a content is not preferable in terms of quality.

The base layer (layer A), the easily adhesive layer (layer B), and/or the easily slippery layer (layer C) of the multilayered stretched polyamide film of the present invention may contain various additives such as a heat stabilizer, an antioxidant, an antistatic agent, a light resisting agent, an impact modifier, a lubricant, and an antiblocking agent, as long as the characteristics such as water-resistant laminate strength are not impaired.

<Properties of Multilayered Stretched Polyamide Film>

The multilayered stretched polyamide film of the present invention exhibits excellent properties of bending fatigue resistance and impact resistance, as well as good processing suitability such as laminating and bag-making processability. Therefore, the multilayered stretched polyamide film of the present invention has the following properties.

The laminate strength of the laminated film obtained by dry laminating the sealant film to the multilayered stretched polyamide film of the present invention as measured by the method described in Examples is 3.3 N/15 mm or more, preferably 3.5 N/15 mm or more in both MD and TD directions. When the laminate strength is 3.3 N/15 mm or more, a packaging bag which is hard to break sufficiently can be obtained.

The water-resistant laminate strength of the multilayered stretched polyamide film of the present invention (laminate strength under condition of water adhesion) is preferably 2.0 N/15 mm or more, and more preferably 3.0 N/15 mm both in MD and TD directions. When the water-resistant laminate strength is 2.0 N/15 mm or more, the film can be used for a pickle bag, a large-size bag for a watery material for commercial use, and the like.

Tensile strength at break of the multilayered stretched polyamide film of the present invention is preferably 150 MPa or more both in MD and TD directions, more preferably 170 MPa or more both in MD and TD directions. When the tensile strength at break is 150 MPa or more, a packaging bag which is hard to break sufficiently can be obtained.

Impact strength of the multilayered stretched polyamide film of the present invention is preferably 0.9 J/15 μm or more, and more preferably 1.0 J/15 μm or more. When the impact strength is 0.9 J/15 μm or more, a packaging bag which is hard to break sufficiently can be obtained.

In the multilayered stretched polyamide film of the present invention, a degree of plane orientation ΔP measured by the method described in Examples is preferably 0.20 or more and 0.40 or less. When the degree of plane orientation ΔP is 0.20 or more, sufficient tensile strength at break and impact strength are obtained. To make the degree of plane orientation ΔP larger than 0.40, stretching ratio is required to be high, which may deteriorate the productivity of the film.

The bending pinhole resistance (the number of pinholes after bending test) of the multilayered stretched polyamide film of the present invention, as measured by the method described in Examples, is preferably 20 or less, and more preferably 10 or less. When the number of pinholes is 20 or less, pinhole generation against bending at the time of transportation can be prevented.

In the multilayered stretched polyamide film of the present invention, dynamic friction coefficient measured by the method described in Examples is preferably 1.0 or less, and more preferably 0.7 or less. When the dynamic friction coefficient is larger than 1.0, the film becomes hard to handle.

<Method for Manufacturing Multilayered Stretched Polyamide Film>

A method for manufacturing the multilayered stretched polyamide film of the present invention will be described below.

At first, a resin raw material is melt extruded using an extruder and is extruded from a T-die in the form of a film. Then, the extruded resin is cast on a cooling roll to be cooled, and an unstretched film is obtained.

The method for laminating the easily adhesive layer (layer B) and the easily slippery layer (layer C) on the base layer (layer A) is preferably a co-extrusion method using a feed block, a multi-manifold, or the like. In addition to the co-extrusion method, a dry lamination method, an extrusion lamination method, or the like can also be selected.

When lamination is performed by the co-extrusion method, a relative viscosity of polyamide to be used for the layer A, the layer B, and the layer C is preferably selected such that the difference between the melt viscosities of the layer A, the layer B, and the layer C is reduced.

A melting temperature of resin is preferably 220 to 350° C. When the temperature is lower than the above, unmelted material or the like are generated, and poor appearance such as defect may be occurred. When the temperature is higher than the above, deterioration of resin or the like is observed, and reduction of molecular weight and deterioration in an appearance may be generated. The temperature of a die is preferably 250 to 350° C.

A temperature of the cooling roll is preferably −30 to 80° C., further preferably 0 to 50° C.

In order to obtain the unstretched film by casting film-shaped molten material extruded from the T-die onto a cooling rotating drum and cooling it, the method using an air knife, the electrostatic adhesion method by applying static charge, or the like is preferably employed. In particular, the latter method is preferably used.

The opposite side of the casted unstretched film onto the cooling roll is preferably cooled. For example, it is preferable to use a combination of the following methods: a method of contacting the opposite side of the unstretched film onto the cooling roll with the cooling liquid in the vessel; a method of applying an evaporating liquid to the opposite side of the unstretched film onto the cooling roll with a spray nozzle; method of cooling the unstretched film by spraying high-speed fluid on the opposite side of the unstretched film onto the cooling roll, and the like. The unstretched film obtained in this way is biaxially stretched to obtain the multilayered stretched polyamide film of the present invention.

The method for obtaining the multilayered stretched polyamide film of the present invention may be either a sequential biaxial stretching method or a simultaneous biaxial stretching method. The sequential biaxial stretching method is preferable since the sequential biaxial stretching method is capable of increasing a film manufacturing speed, and therefore, has an advantage in terms of cost. The film may be a uniaxially stretched film made by a uniaxial stretching method. The uniaxial stretching method produces a uniaxially stretched polyamide film that has good laminate strength. However, the biaxially stretched polyamide film has better shock resistance and pinhole resistance.

As for a device, a conventional sequential biaxial stretching device is used. As for manufacturing conditions, preferable ranges include: an extrusion temperature of 200° C. to 300° C., a stretching temperature in a machine direction (may be abbreviated as MD or MD direction), which is a flow direction of the device, of 50 to 100° C., a stretch ratio in the machine direction of 2 to 5 times, a stretching temperature in a transverse direction (may be abbreviated as TD or TD direction) of the device of 120 to 200° C., a stretch ratio in the transverse direction of 3 to 5 times, and a heat setting temperature of 200° C. to 230° C.

As for the stretching condition in the machine direction (MD) of the multilayered stretched polyamide film of the present invention, the stretching ratio in the machine direction (MD) is preferably not less than 3 times, further preferably not less than 3.16 times, and most preferably not less than 3.2 times. If the stretching ratio in the machine direction is lower than 3 times, the degree of orientation of the film becomes small and sufficient mechanical strength is not obtained.

The stretching ratio of the multilayered stretched polyamide film in the machine direction is preferably not more than 5 times, further preferably not more than 4 times, and most preferably not more than 3.5 times. If the stretching ratio in the machine direction is too high, not only film formation becomes unstable, but also the orientation of the obtained film becomes too high and adhesiveness to the sealant film may deteriorate.

As for the stretching condition in the transverse direction (TD) of the multilayered stretched polyamide film of the present invention, the stretching ratio is preferably not less than 3.0 times, further preferably not less than 3.2 times, and most preferably not less than 3.5 times.

If the stretching ratio in the transverse direction is less than 3.0 times, not only thickness unevenness of the film becomes worse, but also sufficient mechanical strength is not obtained.

The stretching ratio of the multilayered stretched polyamide film in the transverse direction is preferably not more than 5 times, further preferably not more than 4.5 times, and most preferably not more than 4.2 times. If the stretching ratio in the transverse direction is too high, not only film formation becomes unstable, but also the orientation of the obtained film becomes too high and adhesiveness to the sealant film may deteriorate.

A higher heat setting temperature of the multilayered polyamide film of the present invention is preferable since a higher heat setting temperature tends to give higher water-resistant laminate strength. When the heat setting temperature is lower than 200° C., sufficient water-resistant laminate strength and thermal dimensional stability may not be obtained.

When further improvement of the adhesive strength with a sealant is desired, a coating layer may be provided between a layer containing a polyamide copolymer and a sealant layer. In this case, a coating agent is preferably water-resistant to improve water-resistant laminate strength. When improvement of the adhesive strength with a sealant is desired, a corona treatment, a flame treatment, or the like may be performed.

EXAMPLES

Hereinafter, the present invention is described more specifically by means of examples. However, the present invention is not limited to the examples, as long as the gist of the present invention is not exceeded.

Film evaluation was made based on the following measurement methods. Unless otherwise specified, measurements were performed in a measurement room having an environment of 23° C. and a relative humidity of 65%.

(1) Thickness of Film

A film was cut into 10 equal parts in the transverse direction (TD) (as for a narrow film, the film was cut into equal parts such that a width that allows a measurement of a thickness can be ensured). The 10 films were stacked, and then cut into a 100 mm film in the machine direction, and conditioned in an environment at a temperature of 23° C. and a relative humidity of 65% for 2 hours or longer. A thickness at the center of each sample was measured with a thickness measurement device manufactured by TESTER SANGYO CO., LTD., and the average value of the measurements was defined as a thickness.

The thicknesses of a base layer (layer A), an easily adhesive layer (layer B), and an easily slippery layer (layer C) were calculated on the basis of the total thickness of the multilayered stretched polyamide film measured by the above method and the ratio of the discharge quantity of the base layer (layer A), the easily adhesive layer (layer B), and the easily slippery layer (layer C), respectively, at the time of film producing.

(2) Dynamic Friction Coefficient of Film

A dynamic friction coefficient between surfaces of the layer C of a film was evaluated according to JIS-C2151 under the following conditions.

Measurement atmosphere: 23° C., 50% RH (relative humidity)

Test piece: width 130 mm, length 250 mm

Test speed: 150 mm/minute (3) Plane Orientation Coefficient of Film and Difference in Plane Orientation Coefficient From a roll sample, 10 pieces of sample were taken from a roll sample in the transverse direction. In accordance with JIS-K 7142-1996 5.1 (method A), refractive index in the mechanical direction of film ($n_x$), refractive index in the transverse direction of film ($n_y$), and refractive index in the thickness direction of film ($n_z$) of the sample were measured by Abbe refractometer in which a light source was a sodium D line. A plane orientation coefficient (ΔP) was calculated according to the following formula. The average value of the obtained plane orientation coefficients was defined as a plane orientation coefficient.

$$\Delta P=(n_x+n_y)/2-n_z$$

A difference between the maximum value and the minimum value of the 10 samples was defined as a difference in a plane orientation coefficient in the transverse direction.

(4) Tensile Strength at Break of Film

Tensile strength at break of film was measured in accordance with JIS K 7113. A test piece of sample having the width of 10 mm in the machine direction (MD) and the length of 100 mm in the transverse direction (TD) of film was cut out from the film using a razor. After the sample was placed in an atmosphere of 23° C. and 65% RH for 12 hours, measurement was carried out in a distance between chucks of 100 mm and a tensile speed of 200 mm/min under an atmosphere of 23° C. and 65% RH. The average value of five-time measured values was taken. Autograph AG5000A manufactured by Shimadzu Corporation was used as the measurement device.

(5) Impact Strength of Film

Using a film impact tester manufactured by Toyo Seiki Seisaku-sho, Ltd., measurement was performed 10 times in an environment having a temperature of 23° C. and a relative humidity of 65%, and the average value of ten-time measured values was evaluated. The impact spherical surface used was one having a diameter of ½ inch. The unit used was J.

(6) Heat Shrinkage Rate of Film

A film was cut into 5 pieces in the machine direction (MD) and the transverse direction (TD) such that each piece had a width of 20 mm×a length of 250 mm and the obtained 5 pieces were used as test pieces. On each test piece, bench marks were drawn 200 mm±2 mm apart from each other with respect to the center part of the test piece. The distance between the bench marks on the test piece before heating was measured at an accuracy of 0.1 mm. The test piece was hung in a hot air drier (manufactured by ESPEC Corp., PHH-202) in a no-load state, and a thermal treatment was performed under a heating condition of 160° C. for 10 minutes. The test piece was taken out from a thermostatic chamber and cooled to room temperature. Then, the length and the width were measured at the same part as the part where the initial measurement was performed. The dimensional change rate of each test piece was measured in the machine direction and the transverse direction as a percentage of the dimensional change relative to the initial value. As the dimensional change rate in each direction, the average of the measurements in the direction was defined.

(7) Pinhole Resistance

A laminated film was manufactured by the following method, and the number of pinholes of the laminated film was measured using a gelvo flex tester BE1006 with a thermostatic chamber manufactured by Tester Sangyo Co., Ltd.

A polyester-based adhesive agent [a mixture of TM-569 (product name) and CAT-10L (product name) manufactured by Toyo-Morton, Ltd., in a mass ratio of 7.2/1 (solid content concentration 23%)] was coated to a film such that a resin solid content after drying was 3.2 g/m². Thereafter, 40 μm of a linear low density polyethylene film (L-LDPE film: manufactured by Toyobo Co., Ltd., LIX (registered trademark) L4102), as a sealant film, was dry-laminated on the adhesive agent and then aged in an environment of 40° C. for 2 days to obtain a laminated film.

The obtained dry-laminated film was cut into a 28.0 cm×24.0 cm piece. The cut film was left and conditioned under a condition of a temperature of 23° C. and a relative humidity of 50% for 6 hours or longer. Thereafter, the rectangular test film was wound into a cylindrical shape having a diameter of 8.9 cm. One end of the cylindrical-shaped film was fixed to the circumference of a disk-shaped fixing head in the gelvo flex tester. The other end of the cylindrical-shaped film was fixed to the circumference of a disk-shaped movable head in the tester that was opposed to the fixing head with a gap of 19.4 cm therebetween. Next, a flex test was performed repeatedly and continuously for 1000 cycles at a speed of 40 cycles per minute. One cycle of the flex test consists of the following: while the movable head was moved by 7.6 cm in the direction towards the fixing head along an axis between both heads opposed to each other in parallel, the movable head was rotated by 440°. Then, the movable head was moved linearly by 6.4 cm without rotation, and these actions were reversed to move the movable head back to the initial position. The flex test was performed at 1° C. Thereafter, the number of pinholes generated in a 19.4 cm×25.5 cm part in the tested film excluding the parts that were fixed to the circumferences of the fixing head and the movable head was counted (i.e., the number of pinholes per 495 $cm^2$ was counted).

(8) Laminate Strength

A laminated film made by a method similar to that described in the description of the pinhole resistance evaluation was cut into a strip shape having a width of 15 mm and a length of 200 mm. One end of the laminated film was peeled at the interface between the biaxially stretched polyamide film and the linear low density polyethylene film. The laminate strength was measured 3 times using an autograph (manufactured by Shimadzu Corporation) under a condition of a temperature of 23° C., a relative humidity of 50%, a tensile speed of 200 mm/minute, and a peeling angle of 90°. The laminate strength of the strip-shaped laminated film was evaluated with the average value of the measurements.

(9) Water-Resistant Laminate Strength (Laminate Strength Under Condition of Water Adhesion)

A laminated film made by a method similar to that described in the description of the pinhole resistance evaluation was cut into a strip shape having a width of 15 mm and a length of 200 mm. One end of the laminated film was peeled at the interface between the biaxially stretched polyamide film and the linear low density polyethylene film. The laminate strength was measured 3 times using an autograph (manufactured by Shimadzu Corporation) under a condition of a temperature of 23° C., a relative humidity of 50%, a tensile speed of 200 mm/minute, and a peeling angle of 90° while water was being dropped with a dropper to the peeling interface of the strip-shaped laminated film. The laminate strength was evaluated with the average value of the measurements.

(10) Relative Viscosity of Raw Material Polyamide

A polyamide solution was prepared by dissolving 0.25 g of polyamide in 96% sulfuric acid in a 25 ml measuring flask so as to have a concentration of 1.0 g/dl, and a relative viscosity was measured at 20° C. using the polyamide solution.

(11) Melting Point of Raw Material Polyamide

Measurement was performed according to JIS K7121 using a SSC5200 type differential scanning calorimeter manufactured by Seiko Instruments Inc., in a nitrogen atmosphere with a sample mass of 10 mg, a heating starting temperature of 30° C., and a temperature rising rate of 20° C./minute, to obtain an endothermic peak temperature (Tmp) as a melting point.

Example 1

Using an apparatus including an extruder having a bore diameter of 60 mm for a layer A, two extruders having a bore diameter of 25 mm for a layer B and a layer C, and a co-extruding T-die having a width of 380 mm, a mixture in which a polyamide 6 (relative viscosity: 2.8, melting point: 220° C.) and a polyamide 6/66 copolymer (the ratio of polyamide 66 was 25% by mass, relative viscosity: 2.8, melting point: 198° C.) were blended at a mass ratio of 70/30 as a base layer (layer A), a mixture in which polyamide 6 (relative viscosity: 2.8, melting point: 220° C.) and a polyamide 6/66 copolymer (the ratio of polyamide 66 was 25% by mass, relative viscosity: 2.8, melting point: 198° C.) were blended at a mass ratio of 15/85, silica fine particles were added to contain 0.54% by mass, and ethylene bisstearic acid amide was added to contain 0.15% by mass as an easily adhesive layer (layer B), and a mixture in which a polyamide 6 (relative viscosity: 2.8, melting point: 220° C.) and a polyamide MXD6 were blended at a mass ratio of 95/5, silica fine particles were added to contain 0.54% by mass, and ethylene bisstearic acid amide was added to contain 0.15% by mass as an easily slippery layer (layer C) were melt-extruded. The base layer (layer A), the easily adhesive layer (layer B), and the easily slippery layer (layer C) were laminated in a feed block with a configuration of easily adhesive layer (layer B)/base layer (layer A)/easily slippery layer (layer C), and extruded from the T-die into a sheet. The sheet was brought into close contact with a cooling roll whose temperature was regulated to 20° C., to obtain a 200 μm multilayered unstretched sheet.

The raw material used was dried to have a moisture content of 0.1% by mass before use.

As the silica fine particles, particles having a pore volume of 1.6 ml/g and an average particle diameter of 3.9 μm were used.

The obtained laminated unstretched sheet was guided to a roll type stretching machine. The laminated unstretched sheet was stretched 1.7 times at 70° C. and then further stretched 1.91 times at 70° C. in the machine direction utilizing the difference between the circumferential speeds of rollers (MD stretching ratio: 3.25 times). Subsequently, this uniaxially stretched film was guided continuously to a tenter-type stretching machine and preheated at 110° C. Then, the uniaxially stretched film was stretched 3.9 times at 130° C. in the transverse direction, and subjected to a heat setting treatment at 210° C., and then a 5% relaxation treatment at 210° C. to obtain a three-layered laminated biaxially stretched polyamide film in which three types of layers, that is, the layer A, the layer B, and the layer C, were laminated in the order of layer B/layer A/layer C.

As for the thickness of the multilayered stretched polyamide film, the structure of the feed block and the discharge quantities of the extruders were adjusted such that the multilayered stretched polyamide film had a total thickness of 15 μm, the base layer (layer A) had a thickness of 12 μm, and each of the easily adhesive layer (layer B) and the easily slippery layer (layer C) on the front and back sides had a thickness of 1.5 μm.

Examples 2 to 6

A multilayered biaxially stretched polyamide film was made in the same manner as in the film forming method of Example 1 described above, except that resin ratio of each layer and film forming conditions were changed to the conditions shown in Table 1.

Example 7

A multilayered biaxially stretched polyamide film was made in the same manner as Example 1, except that a polyamide 6/12 copolymer (7024B, manufactured by Ube Industries, Ltd., relative viscosity: 2.6, melting point: 201° C.) was used instead of the polyamide 6/66 copolymer.

Examples 8 to 12

A multilayered biaxially stretched polyamide film was made in the same manner as in the film forming method of Example 7 described above, except that resin ratio of each layer and film forming conditions were changed to the conditions shown in Table 1.

Comparative Examples 1 to 7

A multilayered biaxially stretched polyamide film was made in the same manner as in the film forming method of Example 1 described above, except that resin ratio of each layer and film forming conditions were changed to the conditions shown in Table 2.

Comparative Example 8

Using an apparatus including an extruder having a bore diameter of 60 mm for a layer A, an extruder having a bore diameter of 25 mm for a layer B, and a co-extruding T-die having a width of 380 mm, polyamide 6 (relative viscosity: 2.8, melting point: 220° C.) as a base layer (layer A), a mixture in which polyamide 6 (relative viscosity: 2.8, melting point: 220° C.) and a polyamide 6/66 copolymer (the ratio of polyamide 66 was 25% by mass, relative viscosity: 2.8, melting point: 198° C.) were blended at a mass ratio of 15/85 and silica fine particles were added to contain 0.54% by mass, and ethylene bisstearic acid amide was added to contain 0.15% by mass as an easily adhesive layer (layer B) were melt-extruded. The base layer (layer A) and the easily adhesive layer (layer B) were laminated in a feed block with a configuration of surface layer (layer B)/base layer (layer A)/surface layer (layer B), and extruded from the T-die into a sheet. The sheet was brought into close contact with a cooling roll whose temperature was regulated to 20° C., to obtain a 200 µm laminated unstretched sheet.

The raw material used was dried to have a moisture content of 0.1% by mass before use.

As the silica fine particles, particles having a pore volume of 1.6 ml/g and an average particle diameter of 3.9 µm were used.

The obtained laminated unstretched sheet was formed into a film in the same manner as Example 1 to obtain a three-layered biaxially stretched polyamide film in which two types of layers, that is, the layer A and the layer B, were laminated in the order of layer B/layer A/layer B.

Comparative Example 9

Using an apparatus including an extruder having a bore diameter of 60 mm for a layer A, an extruder having a bore diameter of 25 mm for a layer B, and a co-extruding T-die having a width of 380 mm, polyamide 6 (relative viscosity: 2.8, melting point: 220° C.) as a base layer (layer A), a mixture in which silica fine particles were added to contain 0.54% by mass, and ethylene bisstearic acid amide was added to contain 0.15% by mass in polyamide 6 (relative viscosity: 2.8, melting point: 220° C.) as an easily slippery layer (layer C) were melt-extruded. The base layer (layer A) and the easily slippery layer (layer C) were laminated in a feed block with a configuration of surface layer (layer C)/base layer (layer A)/surface layer (layer C), and extruded from the T-die into a sheet. The sheet was brought into close contact with a cooling roll whose temperature was regulated to 20° C., to obtain a 200 µm laminated unstretched sheet.

The raw material used was dried to have a moisture content of 0.1% by mass before use.

As the silica fine particles, particles having a pore volume of 1.6 ml/g and an average particle diameter of 3.9 µm were used.

The obtained laminated unstretched sheet was formed into a film in the same manner as Example 1 to obtain a three-layered biaxially stretched polyamide film in which two types of layers, that is, the layer A and the layer C, were laminated in the order of layer C/layer A/layer C.

Film forming conditions and physical properties of the biaxially stretched polyamide films made in Examples 1 to 12 and Comparative Examples 1 to 10 are shown in Table 1 and Table 2.

TABLE 1

| | | | Examples | | | | | |
|---|---|---|---|---|---|---|---|---|
| | | | 1 | 2 | 3 | 4 | 5 | 6 |
| Composition of base layer (layer A) | Polyamide 6 | % by mass | 70 | 90 | 50 | 70 | 70 | 70 |
| | Polyamide 6/66 | % by mass | 30 | 10 | 50 | 30 | 30 | 30 |
| | Polyamide 6/12 | % by mass | — | — | — | — | — | — |
| Composition of easily adhesive layer (layer B) | Polyamide 6 | % by mass | 14.9 | 14.9 | 14.9 | 39.8 | 14.9 | 14.9 |
| | Polyamide 6/66 | % by mass | 84.5 | 84.5 | 84.5 | 59.6 | 84.5 | 84.5 |
| | Polyamide 6/12 | % by mass | — | — | — | — | — | — |
| | Fine particles | % by mass | 0.54 | 0.54 | 0.54 | 0.54 | 0.54 | 0.54 |
| | Fatty acid amide | % by mass | 0.15 | 0.15 | 0.15 | 0.15 | 0.15 | 0.15 |
| Composition of easily slippery layer (layer C) | Polyamide 6 | % by mass | 94.4 | 94.4 | 94.4 | 94.4 | 94.4 | 94.4 |
| | Polyamide 6/66 | % by mass | — | — | — | — | — | — |
| | Polyamide 6/12 | % by mass | — | — | — | — | — | — |
| | Polyamide MXD6 | % by mass | 5.0 | 5.0 | 5.0 | 5.0 | 5.0 | 5.0 |
| | Fine particles | % by mass | 0.54 | 0.54 | 0.54 | 0.54 | 0.54 | 0.54 |
| | Fatty acid amide | % by mass | 0.15 | 0.15 | 0.15 | 0.15 | 0.15 | 0.15 |
| Total thickness | | µm | 15 | 15 | 15 | 15 | 15 | 15 |
| Thickness ratio of layer A | | % | 80 | 80 | 80 | 80 | 80 | 80 |
| Lamination configuration | | — | B/A/C | B/A/C | B/A/C | B/A/C | B/A/C | B/A/C |
| Stretching temperature in MD direction | | ° C. | 70 | 70 | 70 | 70 | 70 | 70 |
| Stretching ratio in MD direction | | — | 3.25 | 3.25 | 3.25 | 3.25 | 3.16 | 3.50 |
| Stretching temperature in TD direction | | ° C. | 130 | 130 | 130 | 130 | 130 | 130 |
| Stretching ratio in TD direction | | — | 3.9 | 3.9 | 3.9 | 3.9 | 3.9 | 3.9 |
| Heat setting temperature | | ° C. | 210 | 210 | 210 | 210 | 210 | 210 |

TABLE 1-continued

|  |  |  |  |  |  |  |  |  |
|---|---|---|---|---|---|---|---|---|
| Relaxation temperature |  | ° C. | 210 | 210 | 210 | 210 | 210 | 210 |
| Relaxation ratio |  | % | 5 | 5 | 5 | 5 | 5 | 5 |
| Dynamic friction coefficient |  | — | 0.66 | 0.63 | 0.67 | 0.73 | 0.66 | 0.64 |
| Degree of plain orientation |  | — | 0.22 | 0.24 | 0.20 | 0.21 | 0.21 | 0.26 |
| Tensile strength at break | MD | MPa | 200 | 230 | 170 | 195 | 175 | 235 |
|  | TD | MPa | 230 | 250 | 210 | 225 | 211 | 260 |
| Impact strength |  | J/15 μm | 1.20 | 1.25 | 1.10 | 1.21 | 1.10 | 1.30 |
| Bending pinhole resistance |  | piece | 3 | 4 | 3 | 4 | 4 | 3 |
| Heat shrinkage rate | MD | % | 1.0 | 1.0 | 1.0 | 1.0 | 0.9 | 1.2 |
|  | TD | % | 1.4 | 1.4 | 1.4 | 1.4 | 1.4 | 1.4 |
| Laminate strength | MD | N/15 mm | 8.8 | 8.1 | 9.0 | 8.5 | 9.1 | 7.8 |
|  | TD | N/15 mm | 3.8 | 3.7 | 4.0 | 3.7 | 4.1 | 3.8 |
| Water-resistant laminate strength | MD | N/15 mm | 5.2 | 5.5 | 5.5 | 2.3 | 5.3 | 5.0 |
|  | TD | N/15 mm | 3.7 | 3.9 | 3.9 | 2.1 | 3.8 | 3.7 |

| | | | Examples | | | | | |
|---|---|---|---|---|---|---|---|---|
| | | | 7 | 8 | 9 | 10 | 11 | 12 |
| Composition of base layer (layer A) | Polyamide 6 | % by mass | 70 | 90 | 50 | 70 | 70 | 70 |
|  | Polyamide 6/66 | % by mass | — | — | — | — | — | — |
|  | Polyamide 6/12 | % by mass | 30 | 10 | 50 | 30 | 30 | 30 |
| Composition of easily adhesive layer (layer B) | Polyamide 6 | % by mass | 14.9 | 14.9 | 14.9 | 39.8 | 14.9 | 14.9 |
|  | Polyamide 6/66 | % by mass | — | — | — | — | — | — |
|  | Polyamide 6/12 | % by mass | 84.5 | 84.5 | 84.5 | 59.6 | 84.5 | 84.5 |
|  | Fine particles | % by mass | 0.54 | 0.54 | 0.54 | 0.54 | 0.54 | 0.54 |
|  | Fatty acid amide | % by mass | 0.15 | 0.15 | 0.15 | 0.15 | 0.15 | 0.15 |
| Composition of easily slippery layer (layer C) | Polyamide 6 | % by mass | 94.4 | 94.4 | 94.4 | 94.4 | 94.4 | 94.4 |
|  | Polyamide 6/66 | % by mass | — | — | — | — | — | — |
|  | Polyamide 6/12 | % by mass | — | — | — | — | — | — |
|  | Polyamide MXD6 | % by mass | 5.0 | 5.0 | 5.0 | 5.0 | 5.0 | 5.0 |
|  | Fine particles | % by mass | 0.54 | 0.54 | 0.54 | 0.54 | 0.54 | 0.54 |
|  | Fatty acid amide | % by mass | 0.15 | 0.15 | 0.15 | 0.15 | 0.15 | 0.15 |
| Total thickness |  | μm | 15 | 15 | 15 | 15 | 15 | 15 |
| Thickness ratio of layer A |  | % | 80 | 80 | 80 | 80 | 80 | 80 |
| Lamination configuration |  | — | B/A/C | B/A/C | B/A/C | B/A/C | B/A/C | B/A/C |
| Stretching temperature in MD direction |  | ° C. | 70 | 70 | 70 | 70 | 70 | 70 |
| Stretching ratio in MD direction |  | — | 3.25 | 3.25 | 3.25 | 3.25 | 3.16 | 3.50 |
| Stretching temperature in TD direction |  | ° C. | 130 | 130 | 130 | 130 | 130 | 130 |
| Stretching ratio in TD direction |  | — | 3.9 | 3.9 | 3.9 | 3.9 | 3.9 | 3.9 |
| Heat setting temperature |  | ° C. | 210 | 210 | 210 | 210 | 210 | 210 |
| Relaxation temperature |  | ° C. | 210 | 210 | 210 | 210 | 210 | 210 |
| Relaxation ratio |  | % | 5 | 5 | 5 | 5 | 5 | 5 |
| Dynamic friction coefficient |  | — | 0.65 | 0.62 | 0.66 | 0.70 | 0.66 | 0.62 |
| Degree of plain orientation |  | — | 0.22 | 0.24 | 0.20 | 0.21 | 0.21 | 0.26 |
| Tensile strength at break | MD | MPa | 200 | 230 | 170 | 195 | 175 | 235 |
|  | TD | MPa | 230 | 250 | 210 | 225 | 211 | 260 |
| Impact strength |  | J/15 μm | 1.20 | 1.25 | 1.10 | 1.21 | 1.10 | 1.30 |
| Bending pinhole resistance |  | piece | 2 | 4 | 2 | 3 | 4 | 3 |
| Heat shrinkage rate | MD | % | 1.0 | 1.0 | 1.0 | 1.0 | 0.9 | 1.2 |
|  | TD | % | 1.4 | 1.4 | 1.4 | 1.4 | 1.4 | 1.4 |
| Laminate strength | MD | N/15 mm | 8.8 | 8.0 | 9.0 | 8.5 | 9.1 | 7.8 |
|  | TD | N/15 mm | 3.8 | 3.6 | 4.0 | 3.7 | 4.1 | 3.8 |
| Water-resistant laminate strength | MD | N/15 mm | 5.2 | 5.5 | 5.5 | 2.3 | 5.3 | 5.0 |
|  | TD | N/15 mm | 3.7 | 3.9 | 3.9 | 2.1 | 3.8 | 3.7 |

TABLE 2

| | | | Comparative Examples | | | | | | | | |
|---|---|---|---|---|---|---|---|---|---|---|---|
| | | | 1 | 2 | 3 | 4 | 5 | 6 | 7 | 8 | 9 |
| Composition of base layer (layer A) | Polyamide 6 | % by mass | 95 | 40 | 70 | 70 | 70 | 70 | 70 | 70 | 100 |
|  | Polyamide 6/66 | % by mass | 5 | 60 | 30 | 30 | 30 | 30 | 30 | 30 | 0 |
|  | Polyamide 6/12 | % by mass | — | — | — | — | — | — | — | — | — |
| Composition of easily adhesive layer (layer B) | Polyamide 6 | % by mass | 14.9 | 14.9 | 49.7 | 14.9 | 14.9 | 14.9 | 14.9 | 14.9 | — |
|  | Polyamide 6/66 | % by mass | 84.5 | 84.5 | 49.7 | 84.5 | 84.5 | 84.5 | 84.5 | 84.5 | — |
|  | Polyamide 6/12 | % by mass | — | — | — | — | — | — | — | — | — |
|  | Fine particles | % by mass | 0.54 | 0.54 | 0.54 | 0.54 | 0.54 | 0.54 | 0.54 | 0.54 | — |
|  | Fatty acid amide | % by mass | 0.15 | 0.15 | 0.15 | 0.15 | 0.15 | 0.15 | 0.15 | 0.15 | — |
| Composition of easily slippery layer (layer C) | Polyamide 6 | % by mass | 93.9 | 93.9 | 93.9 | 93.9 | 93.9 | 93.9 | 93.9 | — | 98.8 |
|  | Polyamide 6/66 | % by mass | — | — | — | — | — | — | — | — | — |
|  | Polyamide 6/12 | % by mass | — | — | — | — | — | — | — | — | — |
|  | Polyamide MXD6 | % by mass | 5.0 | 5.0 | 5.0 | 5.0 | 5.0 | 5.0 | 5.0 | — | — |
|  | Fine particles | % by mass | 0.54 | 0.54 | 0.54 | 0.54 | 0.54 | 0.54 | 0.54 | — | 0.54 |
|  | Fatty acid amide | % by mass | 0.15 | 0.15 | 0.15 | 0.15 | 0.15 | 0.15 | 0.15 | — | 0.15 |

TABLE 2-continued

|  |  | Comparative Examples | | | | | | | | |
|---|---|---|---|---|---|---|---|---|---|---|
|  |  | 1 | 2 | 3 | 4 | 5 | 6 | 7 | 8 | 9 |
| Total thickness | μm | 15 | 15 | 15 | 15 | 15 | 15 | 15 | 15 | 15 |
| Thickness ratio of layer A | % | 80 | 80 | 80 | 80 | 80 | 80 | 80 | 80 | 80 |
| Lamination configuration | — | B/A/C | B/A/C | B/A/C | B/A/C | B/A/C | B/A/C | B/A/C | B/A/B | C/A/C |
| Stretching temperature in MD direction | °C. | 70 | 70 | 70 | 70 | 70 | 70 | 70 | 70 | 70 |
| Stretching ratio in MD direction | — | 3.25 | 3.25 | 3.25 | 2.90 | 3.80 | 3.25 | 3.25 | 3.15 | 3.15 |
| Stretching temperature in TD direction | °C. | 130 | 130 | 130 | 130 | 130 | 130 | 130 | 130 | 130 |
| Stretching ratio in TD direction | — | 3.9 | 3.9 | 3.9 | 3.9 | 3.9 | 3.9 | 3.9 | 3.9 | 3.9 |
| Heat setting temperature | °C. | 210 | 210 | 210 | 210 | 210 | 190 | 220 | 210 | 210 |
| Relaxation temperature | °C. | 210 | 210 | 210 | 210 | 210 | 190 | 220 | 210 | 210 |
| Relaxation ratio | % | 5 | 5 | 5 | 5 | 5 | 5 | 5 | 5 | 5 |
| Dynamic friction coefficient | — | 0.59 | 0.68 | 0.69 | 0.65 | 0.64 | 0.63 | 0.74 | 1.10 | 0.69 |
| Degree of Plain orientation | — | 0.22 | 0.18 | 0.23 | 0.19 | 0.29 | 0.26 | 0.18 | 0.19 | 0.06 |
| Tensile strength at break MD | MPa | 210 | 140 | 205 | 145 | 250 | 238 | 115 | 168 | 250 |
| TD | MPa | 235 | 200 | 235 | 190 | 260 | 260 | 140 | 209 | 260 |
| Impact strength | J/15 μm | 1.22 | 0.85 | 1.22 | 0.80 | 1.40 | 1.30 | 0.70 | 1.00 | 1.10 |
| Bending pinhole resistance | piece | 3 | 5 | 4 | 3 | 4 | 2 | 10 | 4 | 1 |
| Heat shrinkage rate MD | % | 1 | 1 | 1.0 | 0.8 | 1.3 | 4.0 | 0.3 | 1.0 | 1.0 |
| TD | % | 1.4 | 1.4 | 1.4 | 1.4 | 1.4 | 4.5 | 0.5 | 1.4 | 1.4 |
| Laminate strength MD | N/15 mm | 3.1 | 8.9 | 3.2 | 9.0 | 3.1 | 3.2 | 8.9 | 8.8 | 3.0 |
| TD | N/15 mm | 3.0 | 4.2 | 3.0 | 4.0 | 3.2 | 3.1 | 4.0 | 3.8 | 3.2 |
| Water-resistant laminate MD | N/15 mm | 2.7 | 3.5 | 1.8 | 5.3 | 2.6 | 2.5 | 5.3 | 5.2 | 1.0 |
| strength TD | N/15 mm | 2.6 | 3.5 | 1.5 | 3.8 | 2.8 | 2.6 | 3.9 | 3.7 | 1.0 |

As is clear from the results in Table 1 and Table 2, it is found that sufficient water-resistant laminate strength and excellent printability are obtained in Example 1 to Example 12 in which the easily adhesive layer (layer B) contains not lower than 60% by mass of the polyamide 6/66 copolymer or the polyamide 6/12 copolymer.

In addition, the films of Examples 1 to 12 have also excellent tensile strength at break, due to the specific range of the degree of plane orientation.

On the other hand, in Comparative Example 1, since the content amount of polyamide 6/66 copolymer in the base layer (layer A) was low, adhesive strength between layers was weak due to the large difference in the content of polyamide 6/66 copolymer between the base layer (layer A) and the easily adhesive layer (layer B). As a result, laminate strength of the film was lowered.

In Comparative Example 2, since the content amount of polyamide 6/66 copolymer in the base layer (layer A) was too high, orientation due to stretching was weak and tensile strength at break was lowered.

In Comparative Example 3, since the content amount of polyamide 6/66 copolymer in the easily adhesive layer (layer B) was low, adhesiveness between the sealant and the polyamide film was weak and laminate strength was weak.

In Comparative Example 4, since stretching ratio in MD direction was low, plane orientation of the film and tensile strength at break of the film were lowered.

In Comparative Example 5, since stretching ratio in MD direction was high, plane orientation of film was too high. As a result, adhesive strength between layer B/layer A and adhesive strength between layer A/layer C were decreased, and laminate strength was lowered.

In Comparative Example 6, since the heat setting temperature was low, enough heat to improve the adhesiveness of the adhesive layer (layer B) was not given. Therefore, laminate strength of the film was low. In addition, the film had high heat shrinkage rate and bad dimensional stability.

In Comparative Example 7, since heat setting temperature was too high, the brittleness of the film generated and tensile strength at break was lowered.

In Comparative Example 8, since the easily slippery layer (layer C) was not laminated, the film had high coefficient of friction and insufficient slipperiness. In addition, in comparative Example 8, since the ratio of polyamide 6/66 copolymer in all the layers was high, the film was hard to orient and tensile strength at break was lowered.

In Comparative Example 9, since polyamide 6/66 was not contained in the surface layers, the film of Comparative Example 9 had inferior water-resistant laminate strength.

In Comparative Example 10, adhesiveness was improved by providing a coat layer, however, the film of Comparative Example 10 had inferior printability.

INDUSTRIAL APPLICABILITY

The multilayered stretched polyamide film of the present invention has excellent heat resistance, shock resistance, and pinhole resistance, and also has excellent water-resistant adhesiveness (water-resistant laminate strength). Therefore, the multilayered stretched polyamide film can be suitably used for the application as a packaging material for packaging a liquid and the like.

The multilayered stretched polyamide film of the present invention is applicable as a pickle bag, a large-size bag for a watery material for commercial use, and the like.

The invention claimed is:

1. A multilayered stretched polyamide film which is biaxially stretched, and comprises at least three layers composed of a polyamide resin composition and comprising layer B as an easily adhesive layer, layer A as a base layer, and layer C as an easily slippery layer in this order, wherein the film satisfies the following (1) to (6):
    (1) the layer A contains 50 to 90% by mass of polyamide 6 and 10 to 50% by mass of a polyamide 6 copolymer in which a ratio of a copolymerization component in the copolymer is 3 to 35% by mass;
    (2) the layer B contains 0 to 40% by mass of polyamide 6 and 60 to 100% by mass of the polyamide 6 copolymer in which a ratio of the copolymerization component in the copolymer is 3 to 35% by mass;
    (3) the layer C contains 70% by mass or more of polyamide 6 and 0.05 to 1% by mass of fine particles having an average diameter of 0.1 to 10 μm;

(4) the film has tensile strength at break of 150 MPa or more both in MD direction and TD direction;
(5) the film has laminate strength of 3.3 N/15 mm or more; and
(6) the polyamide 6 copolymer contained in the layer B is a polyamide 6/66 copolymer or a polyamide 6-12 copolymer.

2. The multilayered stretched polyamide film according to claim 1, wherein the multilayered stretched polyamide film has a thickness of 5 to 30 μm, the layer A has a thickness of 4 μm or more, the layer B has a thickness of 0.5 μm or more, and the layer C has a thickness of 0.5 μm or more.

3. The multilayered stretched polyamide film according to claim 1, wherein the film has water-resistant laminate strength of 2.0 N/15 mm or more.

4. The multilayered stretched polyamide film according to claim 2, wherein the film has water-resistant laminate strength of 2.0 N/15 mm or more.

* * * * *